Jan. 1, 1935.  A. ROSNER  1,986,535
BRAKE
Filed Nov. 15, 1930  2 Sheets-Sheet 1
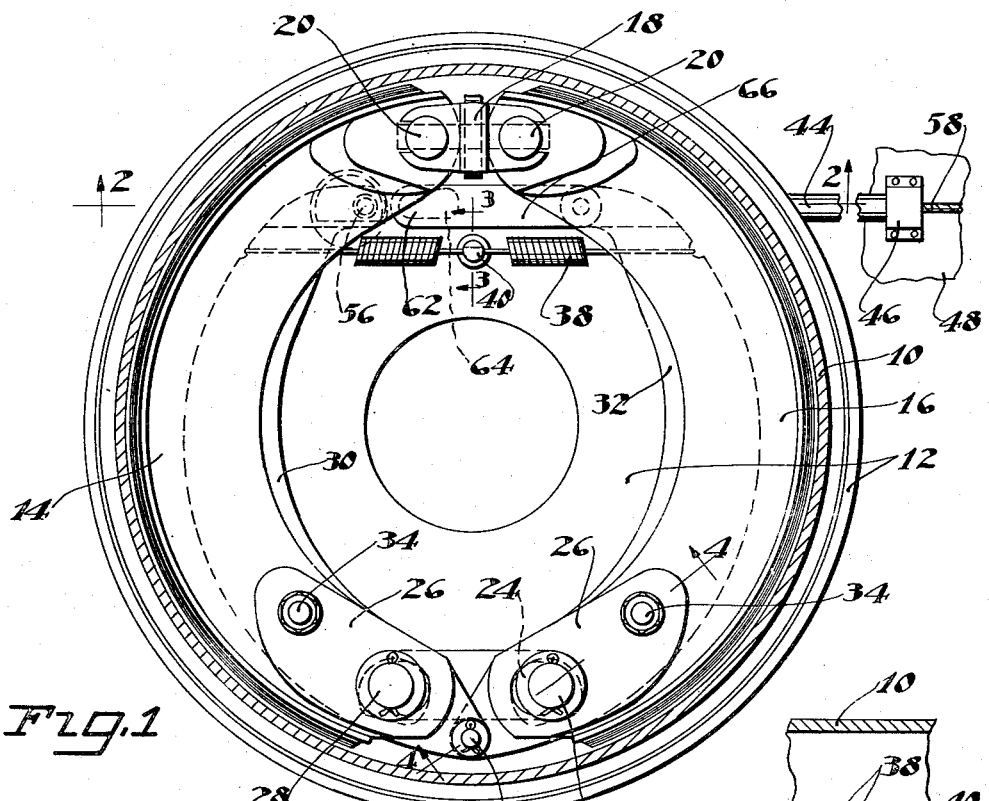
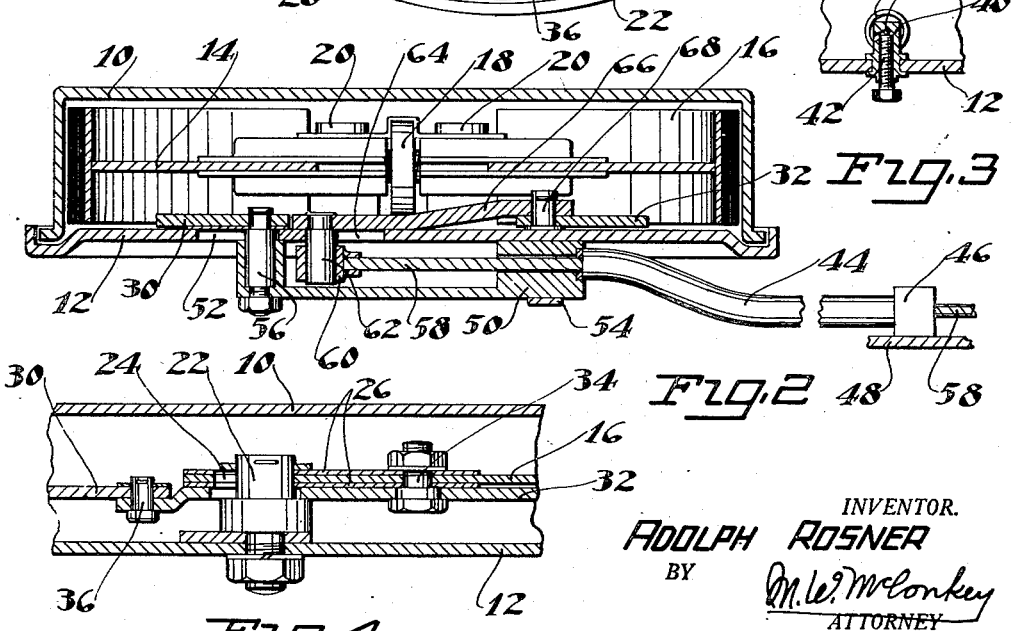
INVENTOR.
ADOLPH ROSNER
BY
M. W. McConkey
ATTORNEY Jan. 1, 1935.    A. ROSNER    1,986,535
BRAKE
Filed Nov. 15, 1930    2 Sheets-Sheet 2

INVENTOR.
ADOLPH ROSNER
BY
M. W. McConkey
ATTORNEY

Patented Jan. 1, 1935

1,986,535

UNITED STATES PATENT OFFICE 1,986,535

BRAKE

Adolph Rosner, South Bend, Ind., assignor to Bendix Brake Company, South Bend, Ind., a corporation of Illinois Application November 15, 1930, Serial No. 495,945

20 Claims. (Cl. 188—78)

This invention relates to brakes and is illustrated as embodied in an internal expanding automobile brake of the shiftable-anchorage type. An object of the invention is to provide novel applying means for the brake which will not interfere with its characteristic mode of operation, and which is preferably housed within the brake chamber formed by the drum and backing plate or their equivalents.

According to one important feature of the invention, a very high leverage is secured at the brake by simple and inexpensive means, by providing a pair of co-operating levers acting respectively on the two shoes or their equivalents at one side of the brake and curved about the brake to be connected to actuating means at the opposite side of the brake in such a manner as to leave the central portion of the brake unobstructed for the passage of an axle or front wheel knuckle or the like.

Another feature of the invention relates to balancing the brake applying force on two members such as the above-described levers, by operatively connecting a flexible conduit of the Bowden type to one of them and arranging within the conduit a force-transmitting medium such as a tension cable which is connected to the other of the operating members. Thus the cable or its equivalent operates one of the levers directly while the other one is operated by the reaction on the conduit caused by the tension on the cable.

The above and other objects and features of the invention, including a novel device for balancing the effectiveness of two parts of a return spring, and other novel and desirable details of construction, will be apparent from the following description of the illustrative embodiments shown in the accompanying drawings, in which:

Figure 1 is a vertical section through the brake just inside the head of the brake drum and showing the brake shoes in side elevation;

Figure 2 is a section on the line 2—2 of Figure 1 and showing the connections of the conduit and the tension cable;

Figure 3 is a partial section on the line 3—3 of Figure 1 showing the means for balancing the effectiveness of the two ends of the return spring;

Figure 4 is a partial section on the line 4—4 of Figure 1 showing the connection of the operating lever to the brake shoe and also showing the anchorage of the shoe;

Figure 5:
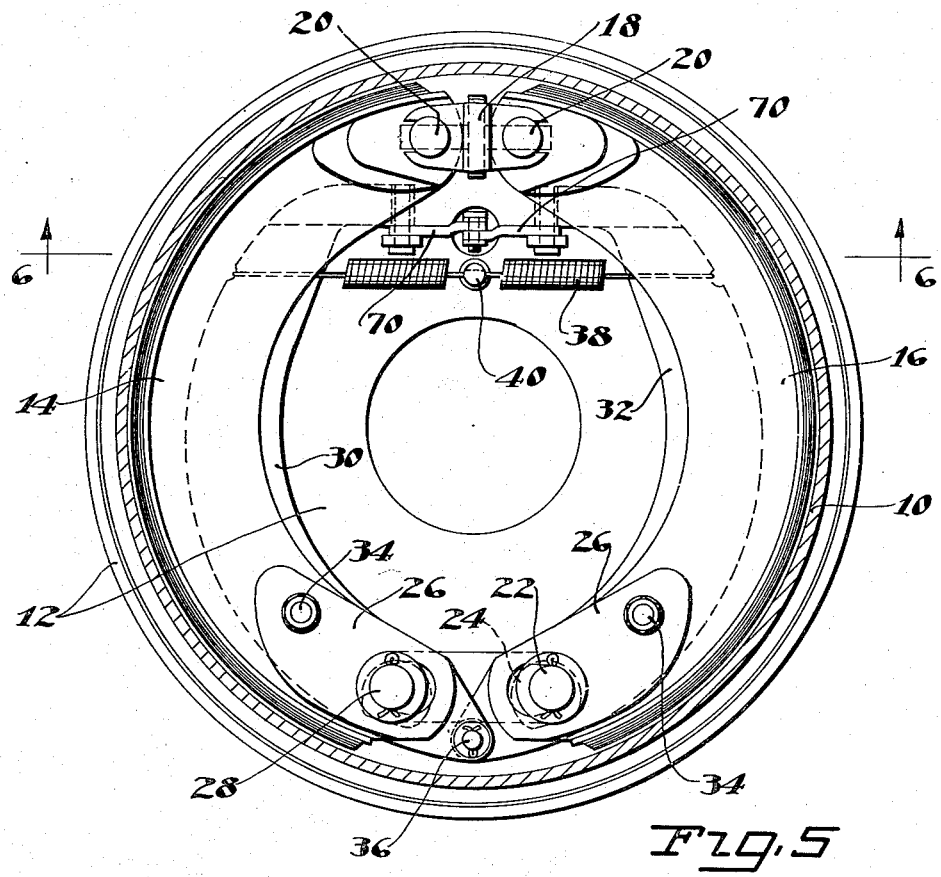
Figure 5 is a section corresponding to Figure 1 and showing a modified arrangement of the brake applying means.

The illustrated brake is of the shiftable-anchorage type and preferably includes a rotatable drum 10, at the open side of which is arranged a suitable support such as a backing plate 12, the drum and the backing plate defining between them a brake chamber containing the friction means of the brake. The friction means may include a pair of generally semi-circular shoes 14 and 16 connected at the upper side of the brake by means such as an adjustable joint member 18 mounted on pivots 20 carried by the ends of the shoes.

When the drum is turning clockwise, the torque of the brake is taken by anchoring means such as a fixed post 22 carried by the backing plate and passing through an elongated opening 24 in the lower end of the shoe 16. The end of the shoe which engages the anchor is reinforced, if desired, by welding plates 26 to its opposite sides. If the drum is turning counterclockwise when the brake is applied, the torque of the brake is taken by an anchoring means such as a similar fixed post 28 also carried by the backing plate and passing through an elongated opening in the lower end of the shoe 14.

According to an important feature of the invention, the brake is applied by a pair of operating members such as levers 30 and 32 curved to clear the central portion of the backing plate 12 so as to leave a relatively large unobstructed space in the center of the brake. The levers 30 and 32 are connected respectively to the shoes 14 and 16 near their lower ends by means such as pivots 34 and are mounted at their lower ends on a floating fulcrum such as a pivot 36 which connects the two levers adjacent the anchored ends of the shoes.

A return spring 38 tensioned between the levers 30 and 32, and which therefore acts on the shoes through the pivots 34, has a resilient portion on each side of its center and a straight portion approximately at its center which passes through a slot in a member such as a bushing 40 riveted or otherwise secured to the backing plate 12. A clamp member such as a set screw 42 is threaded into the bushing 40 and clamps the spring 38 against the opposite wall of the slot in the bushing 40. The two ends of the spring are balanced by loosening the set screw 42 and then applying the brake, whereupon the spring slips through the slot in the member 40 to center itself. While the brake is held so applied, the set screw 42 is tightened again to clamp the center portion of the spring in this adjusted centered portion.

In the arrangement of Figures 1 and 2, the upper ends of the levers 30 and 32 are arranged to be operated to apply the brake by a novel means which is preferably of the Bowden control type. In the arrangement illustrated in these figures, a flexible conduit 44 forming part of this control is fixedly secured at one end to a fitting 46 on the chassis frame 48 of the car, and has at its opposite end a box-shaped fitting 50 arranged over an elongated opening 52 in the backing plate and slidably held against the backing plate by a suitable guide strap 54. The end of the fitting 50 is connected by means such as a pivot 56 with the upper end of the lever 30. Inside of the flexible conduit 44 is arranged force-transmitting means such as a flexible tension cable 58 which passes through the conduit 44 and inside of the boxlike fitting 50 and is provided at its end with a fitting 60 embracing a pivot 62 passing through a guide slot 64 in the backing plate and riveted into the end of a thrust link 66 connected to the upper end of the lever 32 by means such as a pivot 68.

In the operation of the brake just described, tension on the element 58 operates the lever 32 directly through the thrust link 66, while the reaction from the cable on the flexible conduit 44 operates the lever 30 through the fitting 50. This forces the two levers apart to spread the lower ends of the shoes 14 and 16 apart into engagement with the brake drum. If desired, the resilient portion at one end of the spring 38 may deliberately be made stronger than the other one, so that one of the levers 30 or 32 will be operated to apply its shoe of the brake before the other one is operated.

Figure 6:
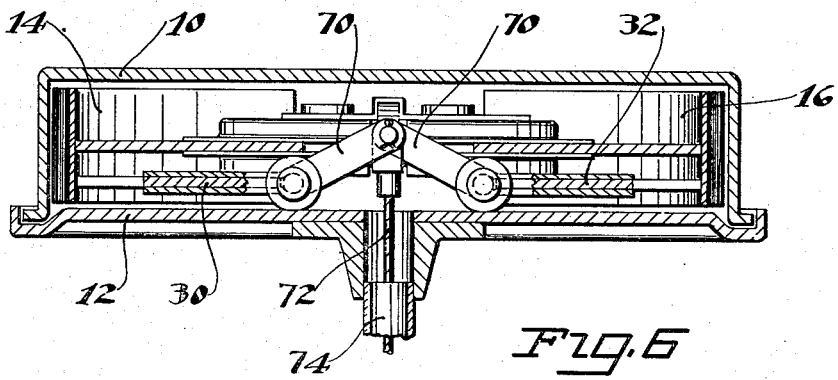
Figure 6 is a section on the line 6—6 of Figure 5 showing the connection of the brake applying means to the above-described levers.

The arrangement in Figures 5 and 6 differs from that just described in that the upper ends of the levers 30 and 32 are operatively pivoted to links 70, which form a toggle opening toward the backing plate, and the knuckle of which is connected to the end of a flexible cable or other tension element 72 passing through a suitable flexible Bowden conduit 74 extending rearwardly to the chassis frame. In this arrangement the reaction of the Bowden conduit is not utilized and the balancing of the forces on the levers 30 and 32 is accomplished by means of the toggle links 70.

While two illustrative embodiments of the invention have been described in detail, it is not my intention to limit the scope of the invention to those particular embodiments or otherwise than by the terms of the appended claims. The invention of the present application is junior to the invention of application No. 457,808, filed May 31, 1930, by Roy S. Sanford and assigned to Bendix Brake Company.

I claim:

1. A brake comprising a backing plate, a friction device generally circular in form carried by said plate adjacent its periphery and arrangeed to leave an unobstructed space at the center of the plate, a pair of operating levers arranged to act on the ends of the friction device and arranged on opposite sides of said space between the friction device and the backing plate, and force-transmitting means acting on the ends of the levers opposite the ends of the friction device.

2. A brake comprising a support having mounted thereon a friction device generally circular in form and arranged to leave an unobstructed space at its center, a pair of operating devices pivotally mounted on and carried by the ends of the friction device and bowed in opposite directions around said space, and force-transmitting means acting on said devices opposite the ends of the friction device.

3. A brake comprising a support having mounted thereon a friction device generally circular in form and arranged to leave an unobstructed space at its center, a pair of operating devices arranged to act on the ends of the friction device and arranged on opposite sides of said space between the friction device and the backing plate, a flexible conduit operatively engaging one operating device and arranged to operate it by reaction there-against, and a flexible tension element extending through the conduit and connected to the other operating device.

4. A brake comprising a friction device having anchors at both ends, a lever acting on each of said ends adjacent its anchor and arranged at the side of its end of the friction device and formed with a clearance opening encircling the corresponding anchor, and means for rocking the two levers to apply the brake.

5. A brake comprising a friction device arranged to shift to anchor at one or the other of its ends, a lever pivoted on and carried by each of said ends and shiftable bodily with said ends in the shifting of the brake anchorage, and means on the opposite side of the brake from said ends for rocking the two levers to apply the brake.

6. A brake comprising a friction device arranged to shift to anchor at one or the other of its ends, a lever pivoted on each of said ends, and extending to the side of the brake opposite said ends, separately-supported floating fulcrum means for the two levers adjacent said ends, and means across the brake from said ends for rocking the two levers to apply the brake.

7. A brake comprising a friction device anchoring alternatively at one or the other of its ends, levers fulcrumed between said ends and each intermediately pivoted to the friction device adjacent one of its ends, the levers being shiftable bodily with their respective ends during the shifting of the brake anchorage, and means acting on the ends of said levers opposite their fulcrums for rocking the two levers to apply the brake.

8. A brake comprising a friction device anchoring alternatively at one or the other of its ends, levers fulcrumed adjacent said ends and each pivoted to the friction device adjacent one of its ends, the levers being shiftable bodily with their respective ends during the shifting of the brake anchorage, a conduit arranged to react against one lever, and a tension element in the conduit connected to the other lever.

9. A brake comprising a friction device anchoring alternatively at one or the other of its ends, levers fulcrumed adjacent said ends and each pivoted to the friction device adjacent one of its ends, and a toggle connected to the ends of said levers.

10. A brake comprising a friction device anchoring alternatively at one or the other of its ends, levers fulcrumed adjacent said ends and each pivoted to the friction device adjacent one of its ends, and a toggle connected to the ends of said levers and arranged in a plane at right angles to the plane of the levers.

11. Brake-applying means comprising a pair of cooperating levers, a conduit reacting against one lever and having at its end a tubular part which has an open side and which is connected to said one lever, and a tension element in the conduit having a connection extending through the open side of said part and connected to the other lever.

12. Brake-applying means comprising a pair of cooperating levers, a conduit operatively engaging one lever and having at its end a tubular part which has an open side and which is connected to said one lever, and a force-transmitting medium in the conduit having a connection extending through the open side of said part and arranged to act on the other lever.

13. A brake comprising a support having mounted thereon a friction device generally circular in form and arranged to leave an unobstructed space at its center, a pair of operating devices arranged to act on the ends of the friction device and arranged between the support and the friction device on opposite sides of said space, a flexible conduit operatively engaging one operating device, and a force-transmitting medium in the conduit and arranged to act on the other operating device.

14. A brake comprising a friction device anchoring alternatively at one or the other of its ends, levers connected at their ends by floating pivot means serving as a floating fulcrum and each pivoted to the friction device adjacent one of its ends, a conduit operatively connected to one lever, and force-transmitting means in the conduit and acting on the other lever.

15. A brake comprising a pair of shoes connected by a floating adjustable joint, floating fulcrum means between the unconnected ends of the shoes, anchorage means for the unconnected ends of the shoes, and applying devices fulcrumed on the fulcrum means and intermediately pivoted to the shoes and acting respectively on the unconnected ends of the shoes to force them toward applied position.

16. A brake comprising a pair of shoes connected by a floating adjustable joint, floating fulcrum means adjacent the unconnected ends of the shoes, levers fulcrumed on the fulcrum means and rocked in opposite directions to act respectively on the unconnected ends of the shoes to force them toward applied position, and means adjacent said joint for acting on the levers to apply the brake.

17. A brake comprising an anchor post, a friction device having an elongated opening embracing said post, and an operating lever fulcrumed adjacent said post and pivoted to the friction device and having a relatively large opening encircling said post.

18. A lever having a box-shaped fitting acting on its end, another lever having a part extending into said fitting, a conduit operatively engaging the fitting, and a force-transmitting medium in the conduit arranged to act on said part.

19. A brake comprising friction means having separable ends and arranged to shift to anchor at one or the other of said ends, in combination with a pair of floating operating levers having their ends connected by a floating fulcrum pivot and intermediately pivoted to the friction means adjacent the separable ends.

20. A brake comprising friction means having separable ends, in combination with a pair of floating operating levers having their ends connected by a floating fulcrum pivot and intermediately pivoted to the friction means and having floating operating means at their ends.

ADOLPH ROSNER.